(12) United States Patent
Vinck

(10) Patent No.: US 6,671,507 B1
(45) Date of Patent: Dec. 30, 2003

(54) AUTHENTICATION METHOD FOR INTER-SYSTEM HANDOVER BETWEEN AT LEAST TWO RADIO COMMUNICATIONS SYSTEMS

(75) Inventor: Bart Vinck, Antwerp (BE)

(73) Assignee: Siemens Aktiengesellschaft, Munich (DE)

( * ) Notice: Subject to any disclaimer, the term of this patent is extended or adjusted under 35 U.S.C. 154(b) by 552 days.

(21) Appl. No.: 09/595,861

(22) Filed: Jun. 16, 2000

(51) Int. Cl.$^7$ ................................................ H04M 1/66
(52) U.S. Cl. ........................ 455/411; 455/436; 455/439
(58) Field of Search ................................. 455/410, 411, 455/422, 462, 436, 512, 422.1, 439; 380/247, 248, 280–281

(56) References Cited

U.S. PATENT DOCUMENTS

| | | | | |
|---|---|---|---|---|
| 5,390,252 A | * | 2/1995 | Suzuki et al. | 380/247 |
| 5,598,459 A | * | 1/1997 | Haartsen | 455/411 |
| 6,167,279 A | * | 12/2000 | Chang et al. | 455/462 |
| 6,230,005 B1 | * | 5/2001 | Le et al. | 455/414 |
| 6,301,479 B1 | * | 10/2001 | Roobol et al. | 455/436 |
| 6,360,103 B2 | * | 3/2002 | Veerasamy | 455/512 |
| 6,370,380 B1 | * | 4/2002 | Norefors et al. | 455/436 |

* cited by examiner

*Primary Examiner*—Nay Maung
*Assistant Examiner*—Tan Trinh
(74) *Attorney, Agent, or Firm*—Laurence A. Greenberg; Werner H. Stemer; Gregory L. Mayback

(57) ABSTRACT

The interoperation between UMTS and GSM in the handover context includes the following method steps. An authentication vector is first generated by the UMTS HLR/AuC and various UMTS authentication parameters (XRES, CK, IK and AUTN) are derived. The authentication vector is distributed, depending on the type of VLR that requests authentication vectors, whether it is a UMTS VLR or a GSM VLR. The UMTS user is authenticated either in UTRAN or in GSM BSS. When a UMTS user is attached through a UTRAN, the controlling VLR initiates UMTS authentication and key agreement. When a UMTS user is attached through a GSM BSS, the controlling VLR initiates GSM authentication and key agreement. This is done using a UMTS authentication vector or a GSM authentication vector, depending on the type of VLR controlling the GSM BSS. The user is then handed over from one system to the other.

1 Claim, 3 Drawing Sheets

AUTHENTICATION METHOD FOR INTER-SYSTEM HANDOVER BETWEEN AT LEAST TWO RADIO COMMUNICATIONS SYSTEMS

BACKGROUND OF THE INVENTION

Field of the Invention

The invention lies in the communications field. More specifically, the invention relates to an authentication process in the context of an inter-system communications handover between two radio communications systems. In particular, the following description deals with the interoperation between UMTS and GSM and to an appropriate handover protocol.

Currently, GSM (Global System for Mobile Communications) is one of the most successful and widely used radio systems for wireless communications. Third generation systems in the UMTS (Universal Mobile Telecommunications System) are being developed. The interoperation and handover scenarios, requirements and priorities must be defined for future use. The inter-operation between UMTS users and networks and GSM users and networks includes the following:

Registration of a user of the one type in a network of the other type, typically including authentication and key agreement. This includes:
- a) Registration of a UMTS user in a GSM serving network. [Highest priority.] In countries with existing GSM networks, UMTS networks are expected to be introduced in islands; for nation-wide coverage for GSM-like services the UMTS user will have to rely on the existing GSM network coverage. This is called USIM roaming.
- b) Registration of a GSM user in a UMTS serving network. [Low priority.] Whether there is an important need for GSM users to access the UMTS network is under dispute. This scenario might be interesting for GSM operators who want to offer their customers roaming opportunities in those countries that are covered by a UMTS network but not with a GSM network. This is called GSIM roaming.

Inter-system handover of a user from a network of the one type to a network of the other type. This includes:
- a) Inter-system handover from a UTRAN to a GSM BSS
  - a1) Of a UMTS user. [High priority.] In countries with existing GSM networks, UMTS networks are expected to be introduced in islands; for nation-wide coverage for GSM-like services the UMTS user will have to rely on the existing GSM network coverage. Inter-system handover will provide service continuation when the UMTS user leaves an area with UMTS coverage. This is part of USIM inter-system handover.
  - a2) Of a GSM user. [Lowest priority.] In UMTS-only countries there obviously is no need for inter-system handover from UTRAN to GSM BSS, and vice versa. In countries with both GSM and UMTS networks there is hardly any need for allowing GSM users on the UMTS network, as the GSM coverage is likely to be larger than the UMTS coverage. The only reason to connect a GSM user to a UMTS network might be congestion of the GSM network in some area. This is part of USIM inter-system handover.
- b) Inter-system handover from a GSM BSS to a UTRAN
  - b1) Of a UMTS user. [Medium priority.] In countries with existing GSM networks, UMTS networks are expected to be introduced in islands; for nation-wide coverage for GSM-like services the UMTS user will have to rely on the existing GSM network coverage. This type of handover would allow a UMTS user who initiated a service through a GSM BSS in an area without UMTS coverage, to be handed over to the UTRAN, as soon as possible, and receive the better quality of service. As soon as he is handed over, he may also initiate extra (UMTS) service capabilities. This is part of USIM inter-system handover.
  - b2) Of a GSM user. [Lowest priority.] The same arguments apply as for inter-system handover in the opposite direction (see 2)a)ii)). This is part of GSIM inter-system handover.

While designing a mechanism to meet these objectives, we assumed that there will be UMTS MSC/VLRs that control both UTRAN and GSM BSS. In addition to that there will be GSM MSC/VLRs controlling GSM BSS.

SUMMARY OF THE INVENTION

It is accordingly an object of the invention to provide a method for an authentication for an inter-system handover between at least two radio-communications systems, which satisfies the objects of such systems. The novel process should provide a solution for inter-system handover between GSM BSS and UTRAN controlled by the same UMTS MSC/VLR, but also for inter-system handover to an from a GSM MSC/VLRs controlling GSM BSS.

With the foregoing and other objects in view there is provided, in accordance with the invention, an authentication method for inter-system handover between at least two radio-communication systems, which comprises: performing a system specific authentication by a register of a network depending on a currently supported access method on a radio-interface between a user-equipment and a base station of the radio-communication system.

Other features which are considered as characteristic for the invention are set forth in the appended claims.

Although the invention is illustrated and described herein as embodied in a method for an authentication for an inter-system handover between at least two radio-communications systems, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
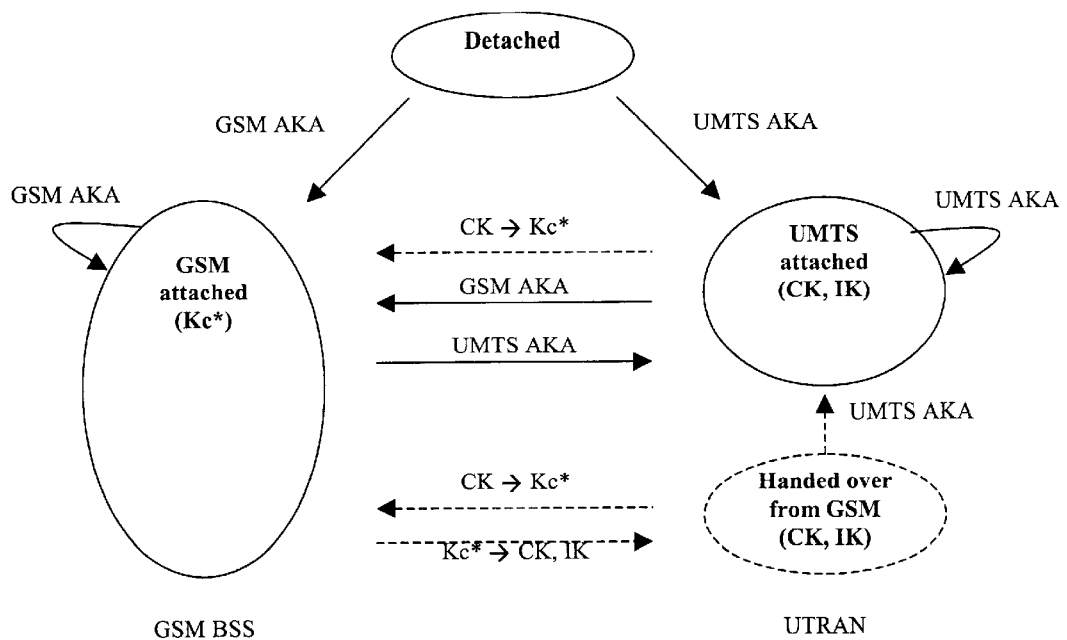
FIG. 1 is a state-transition diagram for UMTS users in UMTS and GSM networks.

The invention will now be described by comparing a first proposed mechanism with our new proposed mechanism. The first mechanism is based on a proposal made by Ericsson Company [3GPP Tdoc S3-99113] which outlined a mechanism for USIM roaming and inter-system handover.

The mechanism (mechanism 1) can be summarised as follows:

1) Generation of an authentication vector. The UMTS HLR/AuC generates a RAND and derives from that the UMTS authentication parameters XRES, CK, IK and AUTN, and in addition, it derives (from the same RAND) a GSM cipher key Kc*. In this way an extended UMTS/GSM authentication vector is generated.
2) Distribution of an authentication vector. The UMTS/GSM authentication vector is distributed to UMTS or GSM VLRs that support inter-system handover for UMTS users.
3) UMTS user authentication in UTRAN. When a user is attached through a UTRAN, the controlling VLR initiates UMTS authentication, i.e., the authentication request contains RAND and AUTN. Upon receipt, the USIM computes the UMTS response RES, the UMTS access link keys CK and IK as well as the GSM cipher key Kc*. It sends back RES. After successful authentication network and user select the UMTS access link keys CK and IK.
4) UMTS user authentication in GSM BSS. When a user is attached through a GSM BSS, the controlling VLR initiates GSM authentication, i.e., the authentication request contains only RAND. Upon receipt, the USIM computes the UMTS response XRES, the UMTS access link keys CK and IK as well as the GSM cipher key Kc*. It computes RES* from RES (conversion function c1) and sends RES* back. The question whether RES* should be different from RES, should be reserved for further study. The network converts XRES into SRES (conversion function c1) and compares RES with SRES. After successful authentication network and user select the GSM cipher key Kc*.
5) Inter-system handover of UMTS user from GSM BSS to UTRAN. When a UMTS user is handed over from GSM BSS to UTRAN, the network and the user select the UMTS access link keys already available at both ends for the new connection.
6) Inter-system handover of UMTS user from UTRAN to GSM BSS. When a UMTS user is handed over from UTRAN to GSM BSS, the network and the user select the GSM cipher key Kc* already available at both ends for the new connection.

No mechanism for GSIM roaming and handover was provided. A similar mechanism is not possible, as the GSIM does not compute CK and IK.

Our proposed mechanism (mechanism 2) can be summarized as follows:

1) Generation of an authentication vector. The UMTS HLR/AuC generates a RAND and derives from that the UMTS authentication parameters XRES, CK, IK and AUTN. No GSM cipher key Kc* is generated.
2) Distribution of an authentication vector. The distribution depends on the type of VLR that requests authentication vectors:
   a) UMTS VLR (controlling UTRAN or both UTRAN and GSM BSS) receive UMTS authentication vectors.
   b) GSM VLR (controlling only GSM BSS) receive GSM authentication vectors (RAND*, SRES*, Kc*). The HLR/AuC constructs them from the UMTS authentication vectors in the following way: RAND*=RAND, SRES*=c1(XRES) and Kc*=c2(CK).
3) UMTS user authentication in UTRAN. When a UMTS user is attached through a UTRAN, the controlling VLR initiates UMTS authentication and key agreement. No GSM cipher key Kc* is derived.
4) UMTS user authentication in GSM BSS. When a UMTS user is attached through a GSM BSS, the controlling VLR initiates GSM authentication and key agreement. This is done using a UMTS authentication vector or a GSM authentication vector, depending on the type of VLR controlling the GSM BSS:
   a) A user attached to a GSM BSS controlled by a UMTS VLR (controlling UTRAN or both UTRAN and GSM BSS). The UMTS VLR converts the UMTS authentication vector into a GSM authentication vector in the same way as the HLR/AuC did before it distributed authentication data to a GSM VLR, see 2) b). The UMTS VLR sends RAND* to the user. The USIM derives RES and CK and converts these parameters to their GSM counterparts in the same way as the VLR did: RES*=c1(RES) and Kc*=c2(CK).
   b) A user attached to a GSM BSS controlled by a GSM VLR (controlling only GSM BSS). The GSM VLR sends the UMTS user RAND*. The USIM derives RES* and Kc* is the same way as in a GSM BSS controlled by a UMTS VLR (see 4)a)).
5) Inter-system handover of UMTS user from GSM BSS to UTRAN. At the network side the old VLR sends Kc* to the new VLR. The new VLR then derives CK and IK from Kc*: CK=c3(Kc*) and IK=c4(Kc*). At the user end, the dual-mode user equipment derives CK and IK in the same way.
6) Inter-system handover of UMTS user from UTRAN to GSM BSS. At the network side the old VLR derives Kc* from CK: Kc*=c2(CK) and sends Kc* to the new VLR. At the user end, the dual-mode user equipment derives Kc* in the same way.

Surprisingly, all functionality is now in place for GSIM roaming too:

1) Generation of an authentication vector. The GSM HLR/AuC generates a GSM authentication vector that consists of (RAND*, SRES*, Kc*).
2) Distribution of an authentication vector. The GSM HLR/AuC distributes GSM authentication vectors to all VLR, regardless its type.
3) GSM user authentication in UTRAN. When a GSM user is attached through a UTRAN, the controlling VLR initiates GSM authentication and key agreement. It sends RAND* to the user. The user derives RES* and Kc*. The dual-mode user equipment sends RES* back to the network. The VLR compares RES* with SRES*. After successful authentication and agreement of a GSM cipher key Kc*, the VLR as well as the user equipment derive UMTS access link keys as already explained under inter-system handover of UMTS users from GSM BSS to UTRAN: CK=c3(Kc*) and IK=c4(Kc*).
4) GSM user authentication in GSM BSS. When a UMTS user is attached through a GSM BSS, the controlling VLR initiates GSM authentication and key agreement.
5) Inter-system handover of GSM user from GSM BSS to UTRAN. The procedure is identical to the one explained under inter-system handover of a UMTS user from GSM BSS to UTRAN. At the network side the old VLR sends Kc* to the new VLR. The new VLR then derives CK and IK from Kc*: CK=c3(Kc*) and IK=c4(Kc*). At the user end, the dual-mode user equipment derives CK and IK in the same way.

6) Inter-system handover of GSM user from UTRAN to GSM BSS. The procedure is identical to the one explained under inter-system handover of a GSM user from UTRAN to GSM BSS. At the network side the old VLR derives Kc* from CK: Kc*=c2(CK) and sends Kc* to the new VLR. At the user end, the dual-mode user equipment derives Kc* in the same way.

The two mechanisms may be best evaluated by comparing the two in juxtaposition. Both mechanisms provide the UMTS users in the UMTS network the same level of security after a UMTS authentication and key agreement has been performed. Both mechanisms also provide the UMTS users from the start of entering the network, mutual authentication between network and user through the use of the data integrity mechanism and therefore, protection against those attacks that rely on the suppression or absence of encryption. However, after an inter-system handover from GSM BSS to UTRAN mechanism 2 provides access link keys with the strength and effective key length of the GSM cipher key (64 bits), whereas mechanism 1 provides the full UMTS effective key length. This results in an advantage for mechanism 1.

Nevertheless, mechanism 2 can still be found acceptable, as one can argue that the user has accepted the GSM level of security (still very much lower, offering no data integrity protection) for this service when he initiated the service in the GSM network or was handed over to the GSM network. Furthermore, the user should require a full UMTS authentication and key agreement, before he initiates new services. This can be accomplished by setting the key lifetime of the newly derived UMTS access link keys CK and IK such that they are only valid for the ongoing service.

Implementing the novel method has a minimal impact. Mechanism 1 requires the implementation of an extra key derivation function a8 in the HLR/AuC and in the USIM. Further, the UMTS VLR but also the GSM VLR that support USIM roaming or inter-system handover have to store extended UMTS/GSM authentication vectors. A conversion function c2 has to be implemented in the VLR controlling GSM BSS.

Mechanism 2 requires the implementation of four conversion functions in UMTS VLR and of two conversion functions in the UMTS HLR/AuC. However, at least three of these functions do not require computations. No changes to the GSM VLR are required.

The novel method is also computationally efficient. Mechanism 1 computes the GSM cipher key Kc* efficiently but computes and distributes this key for each authentication vector regardless of whether the user is likely to roam into a GSM network or not.

Mechanism 2 computes the GSM cipher key Kc* rather inefficiently, but only when needed.

The relative efficiency of the competing schemes are dependent on the frequency of inter-system roaming and handover. The second mechanism has the advantage when inter-system roaming and handover are rare events, i.e., occur much less frequently than that they do not occur, which appears to be a safe assumption.

Mechanism 2 is preferred over mechanism 1. It offers an acceptable level of security to UMTS users when roaming in GSM networks or when handed between UTRAN and GSM BSS. It re-uses the functions implemented in the USIM and in the HLR/AuC as much as possible and hence exploits as much as possible the compatibility of the UMTS and the GSM authentication mechanism. It has the further distinctive advantage that no modifications to existing GSM VLR are required. Furthermore, mechanism 2 provides GSIM alongside USIM roaming and handover without additional functionality being required, whereas a straightforward extension to mechanism 1 would in fact require the migration of UMTS security to GSM (and an upgrade of HLR/AuC, VLR, UE and SIM). As the coverage area of the UMTS networks is likely to increase over time, and the need for inter-system roaming and handover is likely to decrease, the network load for mechanism 2 is decreasing too, while for mechanism 1 it remains unchanged. All of this points to mechanism 2 as being the preferred solution.

The proposed mechanism can be implemented for the interoperation between UMTS and GSM First, the interoperation is described with a USIM as access module. FIG. 1 shows the different security states of a UMTS user in a UMTS and in a GSM network.

The UMTS user is in either one of the following states:

DETACHED: The UMTS user is not registered in any network.

GSM ATTACHED: The UMTS user is attached to a GSM BSS. The user and the VLR controlling the GSM BSS share a GSM cipher key Kc*. This key has either been established during a GSM AKA executed between the VLR controlling that GSM BSS and the user, or has been derived from a UMTS cipher key CK at handover from UTRAN. The user enjoys GSM security.

UMTS ATTACHED: The UMTS user is attached to a UTRAN. The user and the VLR controlling the UTRAN share a UMTS cipher key CK and a UMTS integrity key IK. These keys have been established during a UMTS AKA between the VLR controlling that UTRAN and the user. The user enjoys UMTS security.

HANDED OVER FROM UMTS: The UMTS user is attached to a GSM BSS after a handover from a UTRAN. The user and the VLR controlling the GSM BSS share a GSM cipher key Kc*. This key has been agreed at handover by deriving a GSM cipher key Kc* from the UMTS cipher key CK he was using in the UTRAN. The user enjoys GSM-like security. In case the service initially started in the UTRAN, he is assured the cipher key Kc* is fresh. However, the strength of the key derivation cannot be stronger than that in GSM.

In the state "HANDED OVER FROM GSM" the user is attached to the UMTS network but does not enjoy full UMTS security. However, we believe that this is acceptable, as the user has given his consent to the GSM level of security for this service, when he started his service in the GSM network or when he was (previously) handed over to GSM.

In order to provide the full UMTS level of security, the network should as soon as it sees fit, initiate a UMTS AKA with the user. The USIM should require such a UMTS AKA to take place after a handover from GSM to UMTS, and before a new service is started.

There appears not to be a similar requirement to perform a GSM AKA when a user is handed over from the UTRAN to a GSM BSS. Accordingly, we have not introduced a state called "HANDED OVER FROM UTRAN", as the level of security is not different.

It should be noted that although there are two UMTS security states, users in both states share the same type of access link keys and have the same security features enabled.

With regard to the transitions: In order to support service provision the following procedures should be performed at the following instants:

ATTACH IN A GSM BSS: A GSM AKA shall be performed between the VLR controlling the GSM BSS and the UMTS user.

ATTACH IN A UTRAN: A UMTS AKA shall be performed between the VLR controlling the UTRAN and the UMTS user.

LOCATION UPDATE FROM A UTRAN TO A GSM BSS: A GSM AKA should be performed between the VLR controlling the GSM BSS and the UMTS user. As an alternative, it is allowed to derive a GSM cipher Kc* from the UMTS cipher key CK. In this case the UMTS user enters the state "HANDED OVER FROM UTRAN."

LOCATION UPDATE FROM A GSM BSS TO A UTRAN: A UMTS AKA shall be performed between the VLR controlling the UTRAN and the UMTS user.

HANDOVER FROM A UTRAN TO A GSM BSS: The GSM cipher Kc* may be derived from the UMTS cipher key CK. As an alternative, the GSM AKA may be performed between the VLR controlling the GSM BSS and the UMTS user.

HANDOVER FROM A GSM BSS TO A UTRAN: The UMTS cipher key CK and the UMTS integrity key IK may be derived from the GSM cipher key Kc*. In this case the UMTS user enters the state "HANDED OVER FROM GSM" and does not enjoy full UMTS security. A UMTS AKA should be performed before the user accesses the next service. As an alternative, the UMTS AKA may be performed at handover between the VLR controlling the UTRAN and the UMTS user.

Figure 2:
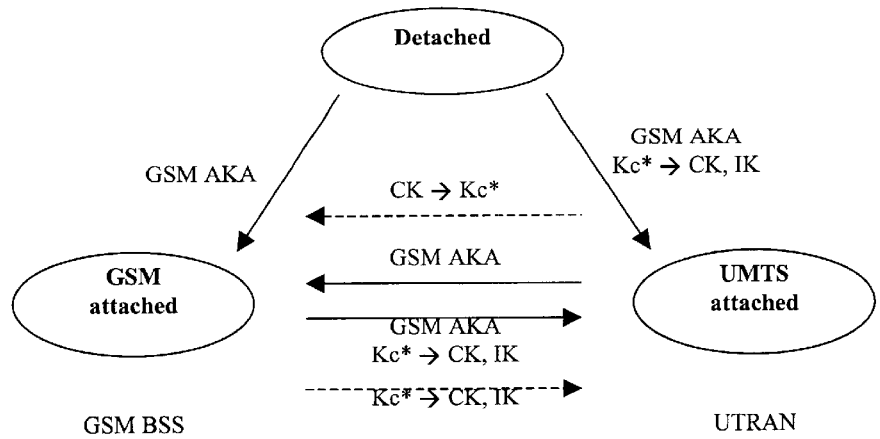
FIG. 2 is a state-transition diagram for GSM subscriber in UMTS and GSM networks.

FIG. 2 refers to the interoperation with a GSIM as access module. FIG. 2 is a state-transition diagram showing the different security states of a GSM subscriber in a UMTS and in a GSM network.

The GSM subscriber is in either one of the following states:

DETACHED: The GSM subscriber is not registered in any network.

GSM ATTACHED: The GSM subscriber is attached to a GSM BSS. The user and the VLR controlling the GSM BSS share a GSM cipher key Kc*. This cipher key has either been established during a GSM AKA or derived from a UM TS cipher key CK at handover from a UTRAN.

UMTS ATTACHED: The GSM subscriber is attached to a UTRAN. The user and the VLR controlling the UTRAN share a UMTS cipher key CK and a UMTS integrity key IK. Both UMTS access link keys have been derived from a GSM cipher key Kc* that may have been established between user and VLR during a GSM AKA when the user was in the UTRAN, or be a Kc* that was in use before handover from a GSM BSS.

In both attached states the GSM subscriber enjoys GSM security.

The following scenarios deal with various transitions. In order to support service provision the following procedures should be performed at the following instants:

ATTACH IN A GSM BSS: A GSM AKA shall be performed between the VLR controlling the GSM BSS and the UMTS user.

ATTACH IN A UTRAN: A GSM AKA shall be performed between the VLR controlling the UTRAN and the UMTS user. Subsequently the serving network and the user derive a UMTS cipher key CK and a UMTS integrity key IK from the GSM cipher key Kc*.

LOCATION UPDATE/HANDOVER FROM A UTRAN TO A GSM BSS: The GSM cipher Kc* may be derived from the UMTS cipher key CK.

As an alternative, the GSM AKA may be performed between the VLR controlling the GSM BSS and the UMTS user.

LOCATION UPDATE/HANDOVER FROM A GSM BSS TO A UTRAN: The UMTS cipher key CK and the UMTS integrity key IK may be derived from the GSM cipher key Kc*. As an alternative, the GSM AKA may be performed between the VLR controlling the GSM BSS and the UMTS user. Subsequently the serving network and the user derive a UMTS cipher key CK and a UMTS integrity key IK from the GSM cipher key Kc*.

Figure 3:
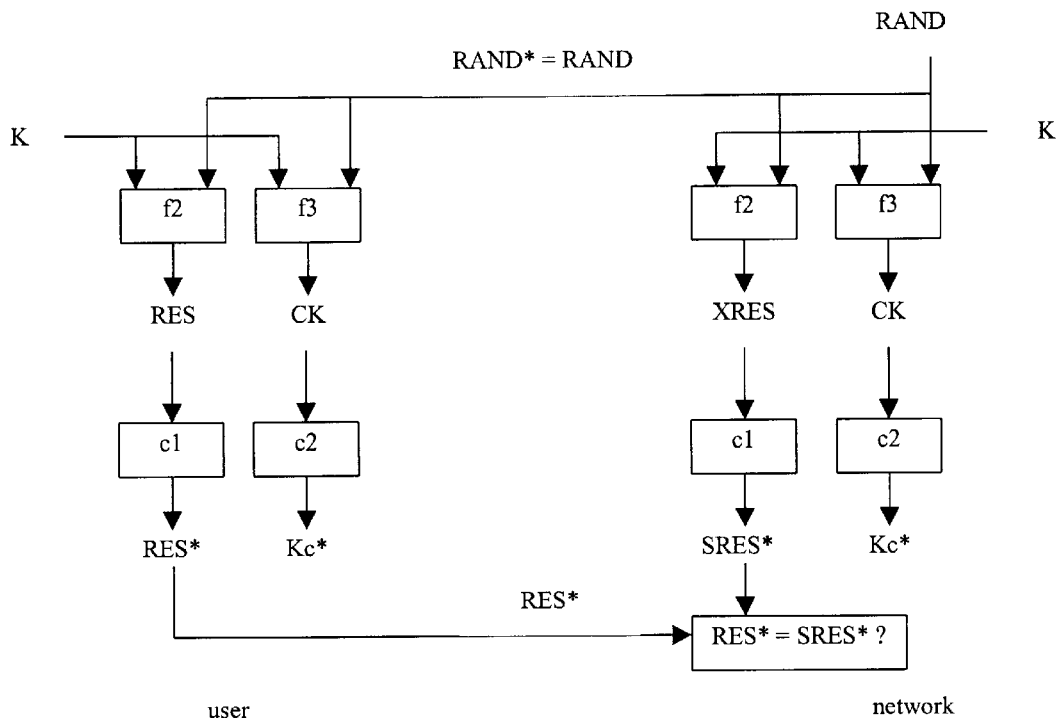
FIG. 3 is a block diagram illustrating GSM AKA between UMTS users and UMTS VLR.
Figure 4:
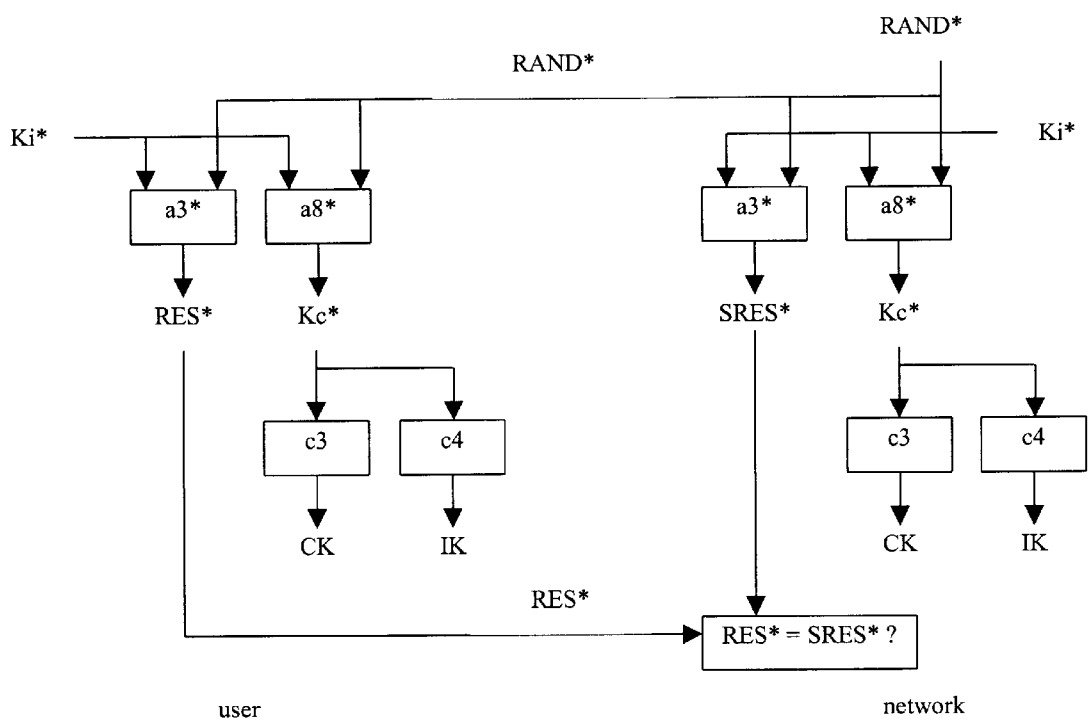
FIG. 4 is a block diagram illustrating GSM AKA between UMTS users and UMTS VLR
Figure 5:
FIG. 5 is a diagram showing how UMTS access link keys are derived from a GSM cipher key.

FIGS. 3–5 deal with various procedures.

FIG. 3 shows how authentication and key agreement is run between the GSM network and the UMTS user, re-using the cryptographic function for UMTS authentication and key agreement, AKA of UMTS users in GSM BSS, Here we propose a mechanism for GSM AKA that re-uses the cryptographic functions already available functionality already available for UMTS AKA.

The GSM components are mapped as follows:

1) RAND*→RAND. A pre-requisite of this mechanism is that UMTS RAND is not longer than GSM RAND*, i.e., 128 bits. Otherwise, if RAND would be longer than RAND*, the values computed at the network end (XRES, CK and finally also SRES* and Kc*) would depend on RAND\RAND*, whereas the values computed at the user end (RES and CK and finally RES* and Kc*) would not depend on RAND \RAND*.

(Note: At the SA-3 meeting #3 in Bonn it was decided that RAND should have the same length as the RAND*, i.e., 128 bits. At the same meeting an Ericsson proposal that RAND=RAND* was accepted.)

2) a3 [Ki] (RAND)→c1 (f2 [K] (RAND)). Hereby c1 is a function that maps XRES (and RES) to SRES* (and RES*) of the appropriate length, i.e., 32 bits. The precise properties of c1 are studied in 0. It is argued there that a simple truncation to 32 bits may be sufficient.

(Note: At the SA-3 meeting #3 in Bonn it was decided that XRES should have a length between 32 and 64 bits.)

3) a8 [Ki] (RAND)→c2 (f3 [K] (RAND)). Hereby c2 is a function that maps CK to Kc* of the appropriate length, i.e., 64 bits. The precise properties of c2 are studied in 0. It is argued there that a one-way function may be sufficient.

(Note: At the SA-3 meeting #3 in Bonn it was decided that CK should be 128 bits long (However, not all of these bits will actually be used).

AKA of GSM users in UTRAN

FIG. 4 shows how authentication and key agreement is run between the UMTS network and the GSM user, deriving the UMTS access link keys CK and IK from the GSM cipher key Kc*.

The UMTS components are mapped as follows:

1) f2 [K] (RAND)→c3 (a8 [Ki] (RAND)). Hereby c3 is a function that extends the length of Kc* to that of a key of the length of CK. For the precise requirements on c3 see 0. Note that c3 should be fully standardised.

2) f 3 [K] (RAND)→c4 (a8 [Ki] (RAND)). Hereby c4 is a function that extends the length of Kc* to that of a key of the length of IK. For the precise requirement on c4 see 0. Note that c4 should be fully standardised.

Handover from GSM BSS to UTRAN

FIG. 5 shows how UMTS access link keys are derived from a GSM cipher key.

Handover from UTRAN to GSM BSS

Figure 6:
FIG. 6 is a diagram showing how a GSM cipher key Kc* is derived from a UMTS cipher key CK.

FIG. 6 shows how a GSM cipher key Kc* is derived from a UMTS cipher key CK.

The conversion functions c1, c2, c3, and c4 will be described below under separate heading.

In this section the requirements on the conversion functions are discussed. The conclusion is that c1, c3 and c4 need not be cryptographic functions, need not require computations at all. Only in the case of c2 it might be necessary to introduce a cryptographic function. All four functions should be standardised.

The conversion function c1: The conversion function c1 converts XRES into SRES* (resp. RES into RES*). XRES has a length between 32 and 64 bits, whereas SRES* has a length of 32 bits.

The question has previously been raised whether XRES is allowed to be equal to SRES*. We are convinced this is acceptable indeed. The only attack we see when XRES equals to SRES* is shown in XXX; a user is camping on a false GSM BSS connected to a UTRAN. The network initiates UMTS authentication and key agreement and is made to believe, by receiving the correct response RES that the user is authenticated through the UMTS authentication and key establishment mechanism. However, the user has only seen RAND. The attack is useless however, and this for the following reasons:

1) The network will select the UMTS access link keys CK and IK, whereas the user will select Kc*. The communication will not work. Even if the intruder suppresses encryption on the downlink channel, and the UMTS does the same on the channel between intruder and network. Even then, the intruder will not have the correct integrity key IK.

2) The intruder must choose RAND*=RAND to receive the proper RES*=RES, i.e., the RAND is fresh after all, unless the network tries to re-use an old authentication vector, which it cannot expect to succeed.

Figure 7:
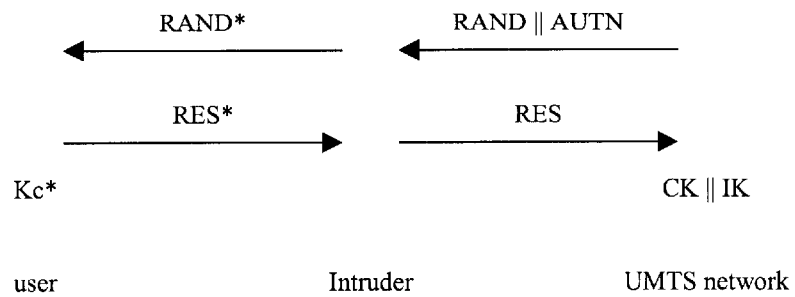
FIG. 7 is a diagram illustrating a useless false base station attack when (X)RES=(S)RES*.

Reference is had to FIG. 7, which illustrates a useless false base station attack when (X)RES=(S)RES*.

We conclude that there is no danger in XRES being of equal length as SRES, in which case XRES and SRES may be identical, and c1 is nothing but the identity function. If XRES is longer than SRES, a truncation function may be chosen for f1.

The conversion function c2: The conversion function c2 converts CK into Kc*. CK has a length of 128 bits, whereas Kc* has a length of 64 bits.

A simple truncation to 64 bits is not sufficient, as a possible compromise of the (too short) GSM cipher key Kc* would in that case give too much information on the UMTS cipher key CK. The remaining part of CK might then be guessed by the intruder (i.e., derived by cryptanalysis of encrypted data). A one-way function may be appropriate. This is a cryptographic function that has the following property (see Menezes, Oorschot, Vanstone—Handbook of Applied Cryptography. CRC Press, Boca Raton 1997):

A one-way function (OWF) is a function f such that for each x in the domain of f, it is easy to compute f(x); but for essentially all y in the range of f, it is computationally infeasible to find any x such that y=f(x).

Using a one-way function would thus provide a GSM cipher key Kc* that would not convey information on CK.

Note however, that once Kc* is derived from CK, CK is never going to be used again. If after being registered or handed over to the GSM BSS he subsequently re-enters the UTRAN, a new UMTS authentication and key agreement is performed and new keys are established before any new services is started. If he is again handed over to the UMTS network, during the same service, new UMTS access link keys CK and IK will be derived from Kc*, which probably convey as much information about CK and IK as Kc* does. Therefore by choosing a one-way function c2 rather than a truncation one only protects the confidentiality of user data encrypted before the inter-system handover from being compromised. A possible alternative to the choice for a one way function, might a truncation function and the additional measure that also a user after handover to the GSM network, performs a new GSM authentication and key agreement before any new service is started, in order to minimise the risk of a compromise of the GSM cipher key and hence of a part of the UMTS cipher key.

The conversion function c3: The conversion function c3 converts Kc* into CK. Kc* has a length of 64 bits, whereas CK has a length of 128 bits, which however, are not all used.

It appears sufficient to define a function that pads Kc* with a fixed sequence of ones and zeros.

The conversion function c4: The conversion function c4 converts Kc* into IK. Kc* has a length of 64 bits, whereas IK has a length of 128 bits, which however, are not all used.

It appears sufficient to define a function that pads Kc* with a fixed sequence of ones and zeros, which should however, be different from the one used to derive the cipher key CK.

The four functions should be allocated as follows:

TABLE 1

Priorities for the implementation of the conversion functions

|  | c1 | c2 | c3 | c4 |
|---|---|---|---|---|
| USIM | Highest | — | — | — |
| UMTS UE | — | Highest | Medium | Medium |
| UMTS VLR | Highest | Highest | Medium | Medium |
| UMTS HLR/AuC | Highest | Highest | — | — |

The table shows the priorities that were assigned in the first section. Note that USIM roaming (in GSM BSS) already requires c1 and c2 to be in HLR, VLR and UE or USIM. No additional functionality is required to support inter-system handover of UMTS users from UTRAN to GSM BSS. c3 and c4 (requiring no computations at all) need to be implemented in VLR and UE to support handover of UMTS users from GSM BSS to UTRAN. Finally, note that no additional functions are required to allow GSIM inter-system roaming and handover.

The fact that no additional functions are required for GSIM roaming is the logical consequence of the fact that no modifications are made to the GSM network (VLR). The GSM network therefore does not distinguish between GSM users and UMTS users who clearly have to pretend to be GSM users in order to be accepted. This indeed results in the fact the hand-over procedures for handover are identical for both types of users.

I claim:

1. An authentication method for inter-system handover between at least two radio-communication systems, which comprises:

generating an authentication vector and deriving therefrom UMTS authentication parameters (XRES, CK, IK and AUTN);

distributing the authentication vector;

if a UMTS user is attached through a UTRAN, authenticating the UMTS user in UTRAN and if a UMTS user is attached through a GSM BSS, initiating a GSM authentication and key agreement; and selectively handing over the UMTS user from GSM BSS to UTRAN or from UTRAN to GSM BSS.

* * * * *